US007185196B1

(12) United States Patent
Kuskin et al.

(10) Patent No.: US 7,185,196 B1
(45) Date of Patent: Feb. 27, 2007

(54) KEY CACHING SYSTEM

(75) Inventors: Jeffrey Scott Kuskin, Mountain View, CA (US); Tao-Fei Samuel Ng, Fremont, CA (US); Deepak Prabhakar Dhamdhere, San Jose, CA (US); Fiona J. Cain, San Jose, CA (US); Andrew M. Davidson, San Jose, CA (US)

(73) Assignee: Atheros Communications, Inc., Sunnyvale, CA (US)

( * ) Notice: Subject to any disclaimer, the term of this patent is extended or adjusted under 35 U.S.C. 154(b) by 639 days.

(21) Appl. No.: 09/662,991

(22) Filed: Sep. 15, 2000

(51) Int. Cl.
*H04L 9/00* (2006.01)
*H04L 29/06* (2006.01)
*H04L 29/00* (2006.01)

(52) U.S. Cl. .................. 713/162; 380/28; 380/270; 709/225; 709/227

(58) Field of Classification Search .............. 455/564; 707/103 R; 711/164, 113, 3, 4, 122; 713/162, 713/200, 201, 189, 187; 395/425, 403, 200; 370/392; 709/225; 380/49, 28
See application file for complete search history.

(56) References Cited

U.S. PATENT DOCUMENTS

| | | | | |
|---|---|---|---|---|
| 4,933,938 A | * | 6/1990 | Sheehy ...................... 370/401 |
| 5,283,882 A | * | 2/1994 | Smith et al. ................ 365/49 |
| 5,442,708 A | * | 8/1995 | Adams et al. .............. 713/153 |
| 5,450,563 A | * | 9/1995 | Gregor ........................ 711/3 |
| 5,692,124 A | * | 11/1997 | Holden et al. ............... 726/2 |
| 5,701,432 A | * | 12/1997 | Wong et al. ................ 711/130 |
| 5,813,031 A | * | 9/1998 | Chou et al. ................. 711/122 |
| 5,826,109 A | * | 10/1998 | Abramson et al. ........... 710/39 |
| 5,845,324 A | * | 12/1998 | White et al. ................ 711/128 |
| 5,930,472 A | * | 7/1999 | Smith ......................... 709/203 |
| 5,950,226 A | * | 9/1999 | Hagersten et al. .......... 711/124 |
| 5,999,629 A | | 12/1999 | Heer et al. ................... 380/49 |
| 6,026,167 A | * | 2/2000 | Aziz ............................ 380/28 |
| 6,170,012 B1 | * | 1/2001 | Coss et al. .................. 709/229 |
| 6,243,667 B1 | * | 6/2001 | Kerr et al. ................... 703/27 |
| 6,259,897 B1 | * | 7/2001 | Kim ......................... 455/575.7 |
| 6,507,908 B1 | * | 1/2003 | Caronni ...................... 713/153 |
| 6,633,902 B1 | * | 10/2003 | Asano et al. ............... 709/203 |
| 6,768,739 B1 | * | 7/2004 | Kobayashi et al. .......... 370/392 |
| 6,771,646 B1 | * | 8/2004 | Sarkissian et al. .......... 370/392 |
| 2004/0083286 A1 | * | 4/2004 | Holden et al. .............. 709/225 |

FOREIGN PATENT DOCUMENTS

EP 0 876 027 11/1998

OTHER PUBLICATIONS

Clarke, O. Sandberg, B. Wiley, and T. Hong, "Freenet: A Distributed Anonymous Information Storage and Retrieval System," ICSI Workshop on Design Issues in Anonymity and Unobservability; 21 pages, Jul. 200.*

* cited by examiner

*Primary Examiner*—Nasser Moazzami
*Assistant Examiner*—Carl Colin
(74) *Attorney, Agent, or Firm*—Rosenberg, Klein & Lee

(57) ABSTRACT

A key-caching system retrieves actively used keys from a relatively fast cache memory for fast processing of wireless communications. Additional keys are stored in relatively slow system memory that has high storage capacity. As keys become needed for active use, the keys are retrieved from the system memory and stored in the cache memory. By using active memory for keys actively being used, system performance is enhanced. By using system memory for keys not being used, a greater number of keys are available for transfer to the cache and subsequent active use.

18 Claims, 4 Drawing Sheets

KEY CACHING SYSTEM

BACKGROUND OF THE INVENTION

1. Field of Invention

The present invention relates to encryption and more particularly to packet encryption in a wireless network.

2. Description of Related Art

Wireless systems include communications, monitoring, and control systems in which electromagnetic or acoustic waves carry a signal through atmospheric space rather than along a wire. In most wireless systems radio-frequency (RF) or infrared (IR) waves are used.

Common examples of wireless equipment in use today include the Global Positioning System (GPS), cellular phones and pagers, cordless computer accessories, home-entertainment-systems control boxes, remote garage door openers, two-way radios, and baby monitors. In particular, wireless local area networks (WLANs) are becoming increasingly popular.

The 802.11 standard for WLANs is a popular standard developed by the Institute for Electrical and Electronics Engineers (IEEE). The objective of such a standard is to tailor a standardized model of operation to resolve compatibility issues between manufacturers of WLAN equipment. The standard provides for one IR-based layer and two RF-based layers for data transmission, direct-sequence spread spectrum (DSSS), and frequency-hopping spread spectrum (FHSS).

FIG. 4 is a diagram illustrating a wireless local area network (WLAN) 60 that includes three access points 62a, 62b, 62c that act as fixed base stations for carrying out communications with mobile units in the network 60. Each of the access points 62a–62c has an associated circle or sphere of operation 64a, 64b, 64c that represents a physical range for data transmissions from that access point. A first station 66 acts as a mobile unit that traverses a path 68 so that over time, the first station 66 moves sequentially through the circles of operation 64a, 64b, 64c respectively corresponding to the first access point 62a, the second access point 62b, and the third access point 62c. Then, for example, as the first station 66 moves from the first circle of operation 64a to the second circle of operation 62b, communications of the first station 66 in the network 60 must transition from the first access point 62a to the second access point 62b.

Issues related to security and, in particular, encryption have become increasingly important in wireless communication, mainly because of the sensitivity of the transmitted data. Encryption is the process of converting data into a form, called ciphertext, that cannot be easily understood by unauthorized individuals. Decryption is the process of converting encrypted data back into its original form so that it can be understood.

The complementary processes of encryption and decryption are based on the use of one or more keys associated with the source or destination of the data. In order to easily recover the contents of an encrypted signal, the correct decryption key is required, where this key determines an algorithm that reverses the work of the encryption algorithm. Typically in a WLAN there is an encryption key and a decryption key associated with each user such as the first station 66.

Encryption and decryption are also important in wireless communications because wireless circuits are relatively easy to tap when compared with their hard-wired counterparts. For example, with reference to FIG. 4, when the first station 66 is physically in the first circle of operation 64a, then the first access point 62a transmits signals intended for the first station 66. However, other stations (not shown) may also be physically in the first circle of operation 64a and therefore able to receive the signals intended for the first station 66. Therefore, signals sent by the access points 62a–62c to the first station 66 must be encrypted in order to prevent unauthorized eavesdropping by other stations. Likewise, the access points 62a–62c must decrypt the signals sent by the first station 66 for receipt by one of the access points 62a–62c in the network.

As the first station 66 moves through the network 60, key management is essential for the access points 62a–62c that potentially must encrypt and decrypt signals associated with many users (i.e., stations 66), where unique keys are associated with each user. In a conventional WLAN network, all keys are typically kept in active memory at the access points 62a–62c, thus limiting the maximum number of users that can be supported adequately and simultaneously in the network. Because of the potentially large number of users in the network 60, a substantial burden on the system resources of the access points 62a–62c may result from storing all keys in active memory, that is, memory that is accessible very quickly and efficiently by the networking unit. On the other hand, storage of keys in system memory that is relatively slow to access is typically unacceptable for the speeds needed for real-time wireless communication. As the number of users and the bandwidth requirements increase for WLANs, efficient key management at the access points 62a–62c is crucial for system performance. The first station 66 may also need to carry out operations related to key management although typically on a smaller scale. The station 66 must adapt transmissions according to its path 68 through the network 60 so that different access points 62a–62c are used at different times. Additionally, the station 66 may need to associate multiple keys with multiple users of the station 66 although in the typical operational setting a single key may be used for the station 66.

In view of the above, there is a need for a key management system that provides performance that is superior to conventional methods and devices.

SUMMARY OF THE INVENTION

Accordingly, it is an object of this invention to provide a key caching system for wireless communications systems.

It is a further object to provide a key-caching system that advantageously uses different memory systems.

It is a further object to provide a key caching system that accommodates a large number of keys in a flexible way that enhances system bandwidth It is a further object to provide a key caching system that operates automatically and transparently to a user.

The above and related objects of the present invention are realized by a system that retrieves actively used keys from a relatively fast cache memory for fast processing of wireless communications. Additional keys are stored in relatively slow system memory that has high storage capacity. As keys become needed for active use, the keys are retrieved from the system memory and stored in the cache memory.

A preferred embodiment of a key-caching system according to the present invention includes a system memory, a networking unit, a processor and a controller, where the controller effects communication and data transfer between the system memory, the networking unit and the processor. The system operates on a packet received from an external source where the packet includes a header that is not encrypted and a body that is encrypted. The networking unit includes a cache, and both the system memory and the cache include entries for source addresses and corresponding keys. The system memory includes a key-caching program that is executable on the processor and includes code for:

(1) extracting a source address from the header;

(2) determining whether the source address is included in an entry in the cache;

(3) authorizing an acknowledgment signal for the external source, extracting from the entry of the cache a key corresponding to the source address and using the key to decrypt the body of the packet when the source address is included in an entry of the cache;

(4) determining whether the source address is included in an entry of the system memory when the source address is not included in an entry of the cache; and (5) extracting from the entry of the system memory a key corresponding to the source address and storing the source address and the key as a new entry in the cache when the source address is not included in an entry of the cache and the source address is included in an entry of the system memory.

According to a first aspect of the invention, the key-caching program further includes code for dropping the packet when the source address is not included in an entry of the cache. In this way the system is prepared for decryption of the packet when it is resent by the external source as is customary in a wireless network when receipt of a packet is not acknowledged to the sender.

According to a second aspect of the invention, the key-caching program further includes code for: (1) authorizing an acknowledgment signal for the external source when the source address is not included in an entry of the cache; and (2) using the key to decrypt the body of the packet when the source address is not included in an entry of the cache and the source address is included in an entry of the system memory. In this way the system operates to decrypt the packet without requiring it to be resent by the external source.

The present invention advantageously combines the use of cache memory and system memory in a key-caching system. By using active memory for keys actively being used, system performance is enhanced. By using system memory for keys not being used, a greater number of keys are available for transfer to the cache and subsequent active use.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, where.

DETAILED DESCRIPTION OF THE PRESENTLY PREFERRED EXEMPLARY EMBODIMENTS

Figure 1:
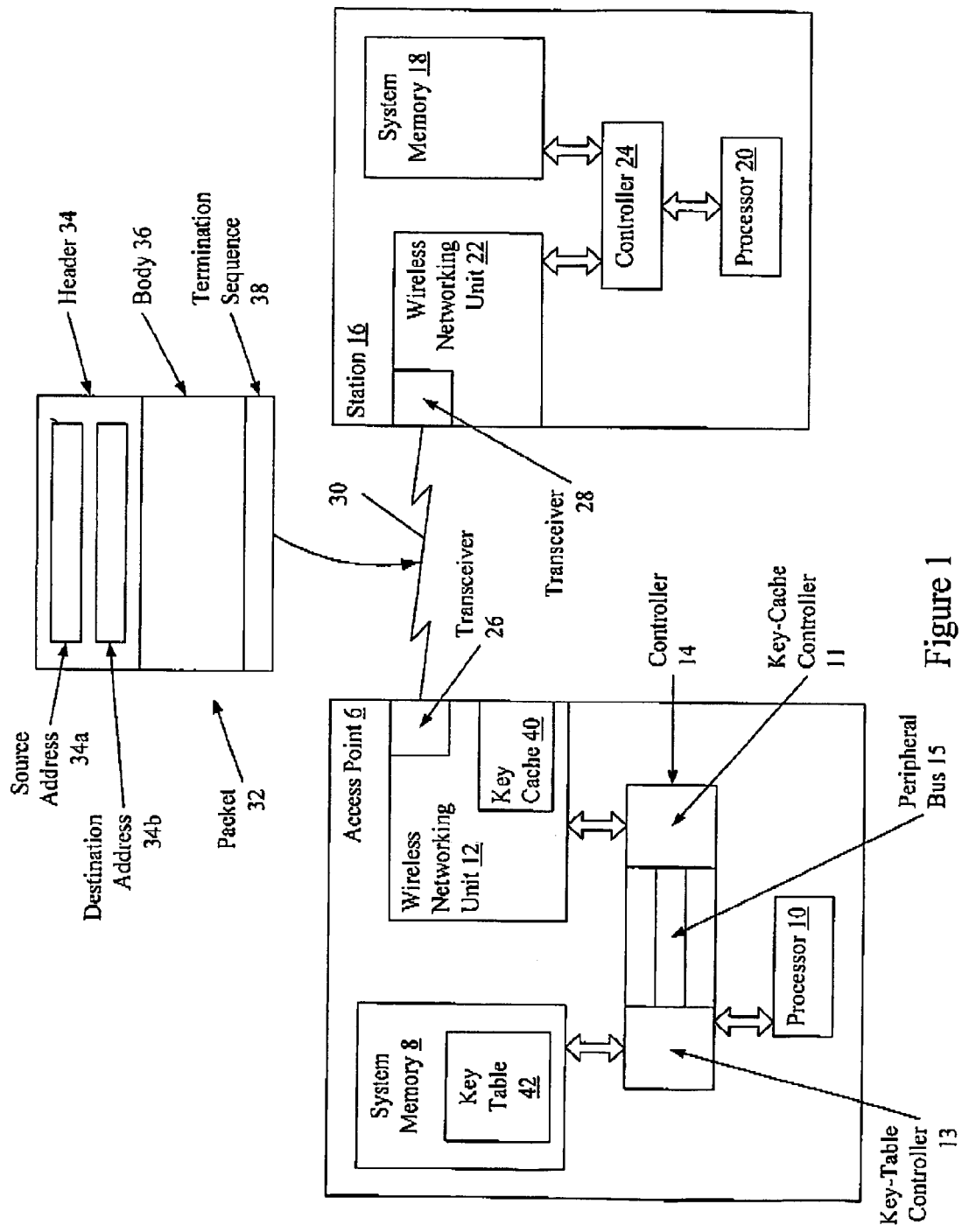
FIG. 1 shows a key-caching system according to a preferred embodiment of the present invention.

A key-caching system 4 according to a preferred embodiment of the present inventions is illustrated in FIG. 1. An access point 6 includes a first system memory 8, a first processor 10, and a first wireless networking unit 12. Communications between these components 8, 10, 12, is effected by a first controller 14. The first controller 14 includes a key-cache controller 11 for control of the key cache 40 and a key-table controller 13 for control of the key table 42. A peripheral bus 15 joins the key-cache controller 11 and the key-table controller 13.

A station 16 includes a second system memory 18, a second processor 20, and a second wireless networking unit 22. Communications between these components 18, 20, 22 is effected by a second controller 24.

The first networking unit 12 and the second networking unit 22 respectively include a first transceiver 26 and a second transceiver 28 that operate to form a wireless connection 30 between the access point 6 and the station 16, where the connection 30 conforms to the 802.11 WLAN standard. This connection 30 is part of a packet-switched network to transfer a sequence of packets such as a packet 32 having a header 34, a body 36, and a termination sequence 38. The header 34 may include address information including a source address 34a and a destination address 34b. The body 36 includes a unit of data being transferred between a source (e.g., station 16) and a destination (e.g., access point 6). The termination sequence 38 may include error correction means such as a CRC (cyclic redundancy check).

Typically the header 34 is not encrypted; that is, it is sent as plain text. However, for security purposes other parts of the packet 32 (e.g., the body 36 and the termination sequence 38) are encrypted based on a key that corresponds with the source of the transmission. As a result, the packet 32 must be decrypted using a key that depends on the source of the transmission. In order to maintain the speed of the wireless connection 30, the keys are stored in a key cache 40, an active memory unit onboard the first networking unit. The key cache 40 may be a memory unit used exclusively for this purpose, as illustrated in FIG. 1, or may be some allocation of a memory unit used for additional functions.

The key cache 40 is typically limited in size because of the expense associated with memory that is quickly and easily accessible to the networking unit 12. This memory is expensive because: (1) it consumes die area and power, both of which are exceedingly precious commodities whose consumption translates directly into added costs for chip manufacturing and implementation; and (2) it is built using semiconductor manufacturing techniques that are optimized for logic gates and not for memory, thereby again increasing cost substantially.

Figure 2:
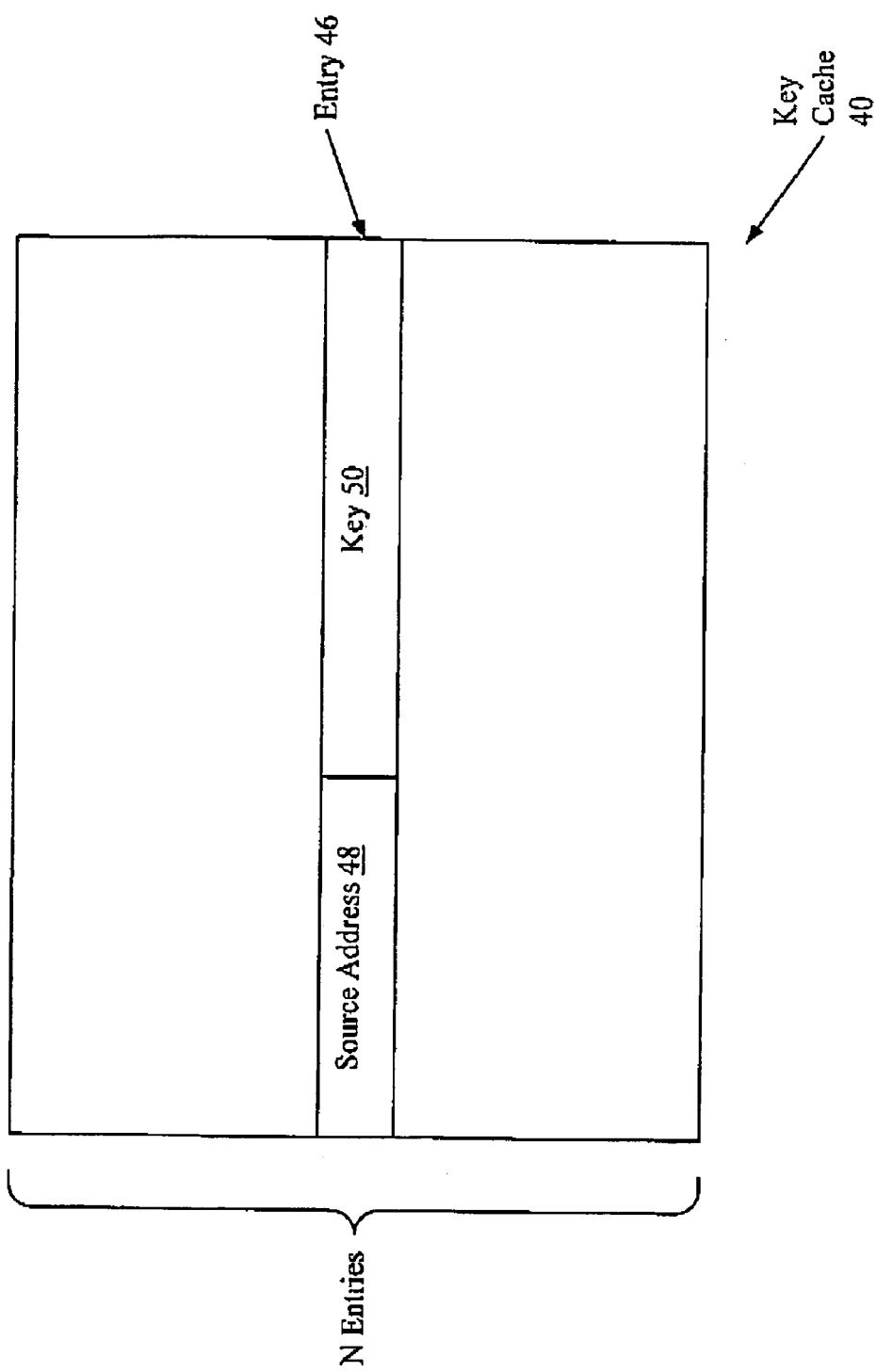
FIG. 2 shows a key cache as used in the key caching system of FIG. 1.

As illustrated in FIG. 2, the key cache 40 includes N entries, where an entry 46 includes a source address 48 and a key 50. The source address 48 (e.g., station 16 or access point 6) typically may require 48 bits of storage while the key 50 may require 128 bits of storage.

Figure 3:
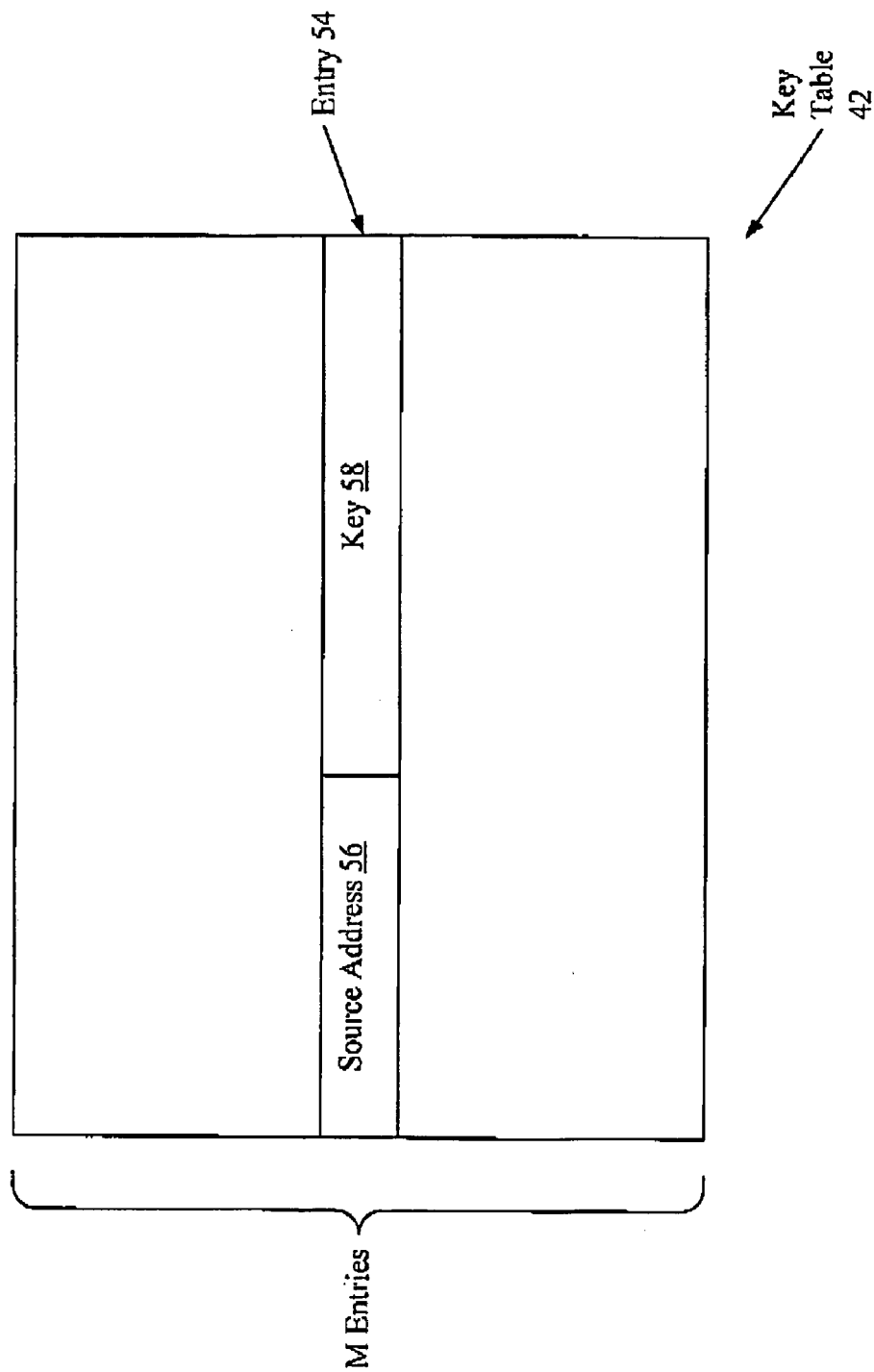
FIG. 3 shows a key table as used in the key caching system of FIG. 1.
Figure 4:
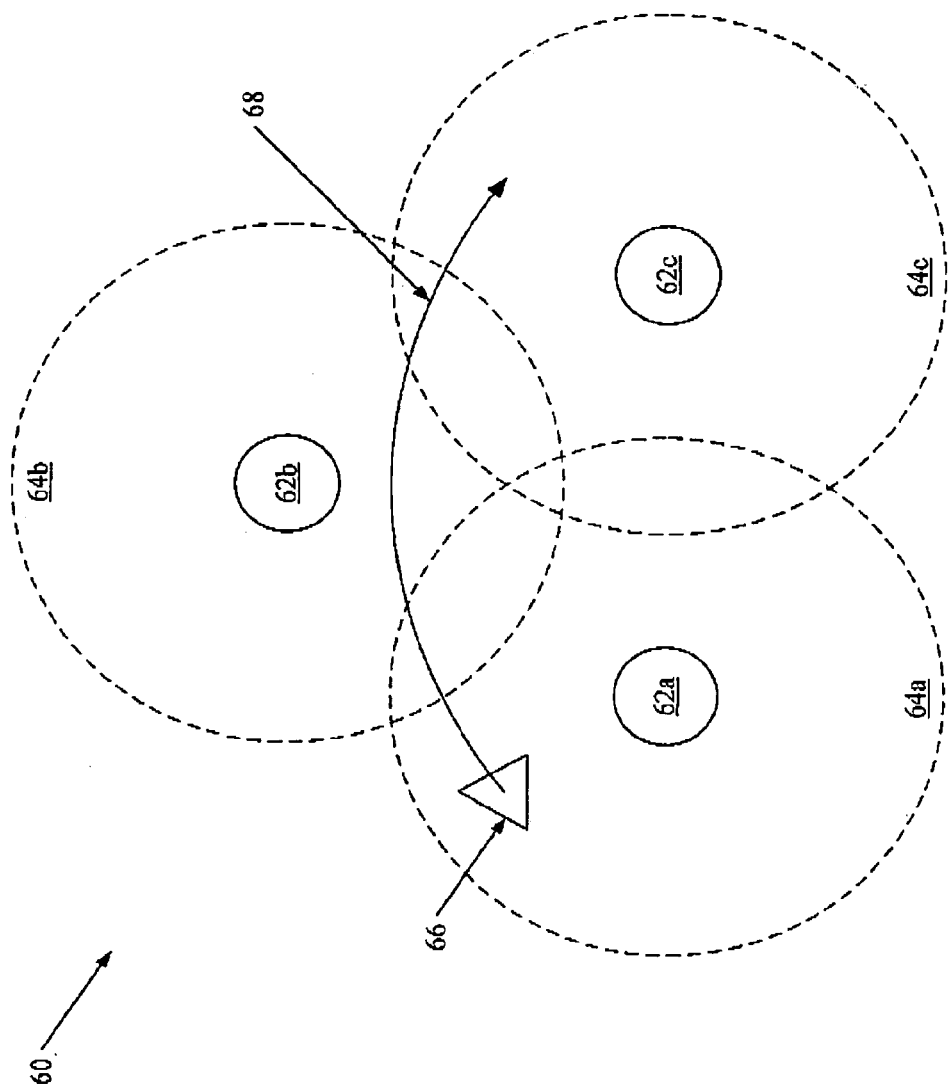
FIG. 4 is a diagram illustrating a wireless local area network (WLAN).

Because of the substantial limitations of onboard storage (e.g., limited to N entries), a key table 42 as shown in FIG. 3 may also be kept in the first system memory 8. For example, the size of the key cache 40 may be limited to N=50 because of the constraints associated with onboard memory (e.g., space, power consumption), but the number of possible stations (e.g., station 16) may be in the hundreds or thousands. Because storage space for the key table 42 in the first system memory 8 is not subject to the constraints associated with the key cache 40, the size of the key table 42 is not substantially limited in practical terms.

The structure of the key table 42 is similar to the key cache 40. That is, as illustrated in FIG. 3, the key table 42 includes M entries, where an entry 54 includes a source address 56 and a key 58. As with the key cache 40, the source address 48 typically requires 48 bits of storage while the key 58 requires 128 bits of storage. Typically the number of entries in the key table 42 is much larger than the number of entries in the key cache (e.g., N=50, M=5,000).

Typically access to the key table 42 in the first system memory 8 is too slow for acceptable operation of the wireless connection 30. The key table 42 then becomes a repository for all the keys that may be necessary to decrypt the packet 32, while the key cache 40 is an active memory unit for keys that are currently being used. If a key not in the key cache 40 is necessary for decryption of the packet 32, it is first accessed from the key table 40 and then stored in the key cache 42 from which it can be used. To make room for new entries in the key cache 40, current entries may be deleted according to some prioritization system; for example, if entries in the key cache 40 are tagged according to how recently an entry has been accessed, entries that have been accessed least recently may be deleted first. Alternatively, entries may be deleted randomly when a new entry is being added.

Entries are deleted from the key cache 40 simply by overwriting them. The network controller provides a means for the processor to write to the key cache 40 so that the processor can overwrite (i.e., replace) an entry in the key cache 40 with a new one.

According to a first preferred embodiment of the present invention, the packet 32 is transmitted from the second transceiver 28 and received at the first transceiver 26. A key-caching program is executed on the first processor 10 to carry out the required operations with respect to the packet 32. First the header 34 of the packet 32 is read to determine the source address 34*a* of the packet 32 (i.e., station 16). Next a search through the enumerated key cache 40 determines whether the key necessary to decrypt the packet 32 is currently stored as an entry 46; that is, the search determines whether the source address 34*a* of the packet 32 is listed as a source address 48 in the key cache 40.

If the source address of the packet 32 is found in the key cache, then the corresponding key 50 is retrieved from the key cache 40 and the packet is decrypted and then stored in the system memory 8. Additionally, an acknowledgment signal is authorized so that an acknowledgment signal can be sent by means of the transceivers 26, 28 from the access point 6 to the station 16.

If the source address of the packet 32 is not found in the key cache 40, then the key table 42 is likewise searched for the source address of the packet 32. If the source address of the packet 32 is found in the key table 42, then the corresponding key 50 is retrieved from the key table 42, and a new entry 46 is provided in the key cache 40 to include the packet's source address 48 and its corresponding key 50.

Additionally, if the source address of the packet 32 is not found in the key cache 40, the packet 32 is dropped (i.e., deleted). Then, because the relevant key is now stored in the key cache 40, the access point 6 is prepared to decrypt the packet 32 if it is resent by the station 16.

This aspect of the first embodiment of the present invention takes advantage of typical wireless communication networks where packets that are not acknowledged by an acknowledgement signal are resent after some latency period. That is, after the station 16 receives an acknowledgment signal for the packet 32, the station 16 continues communications operations (e.g., sending additional packets). Alternatively, if the station 16 has not received an acknowledgement signal for the packet 32 after some waiting period has passed, the station 16 resends the packet 32 to the access point 6 so long as the station 16 is still attempting to communicate with the access point 6.

Alternative embodiments of the invention may include also sending an acknowledgment signal for the packet 32 when the key does not appear in the key cache 40. According to a second preferred embodiment of the present invention, the packet 32 is transmitted from the second transceiver 28 and received at the first transceiver 26. A key-caching program is executed on the first processor 10 to carry out the required operations with respect to the packet 32. First the header 34 of the packet 32 is read to determine the source address 34*a* of the packet 32 (i.e., station 16). An acknowledgement signal is authorized so that an acknowledgment signal can be sent by means of the transceivers 26, 28 from the access point 6 to the station 16.

After the source address 34*a* of the packet 32 has been determined, a search through the enumerated key cache 40 determines whether the key necessary to decrypt the packet 32 is currently stored as an entry 46; that is, the search determines whether the source address 34*a* of the packet 32 is listed as a source address 48 in the key cache 40.

If the source address of the packet 32 is found in the key cache 40, then the corresponding key 50 is retrieved from the key cache 40 and the packet 32 is decrypted and then stored in the system memory 8.

If the source address of the packet 32 is not found in the key cache 40, then the key table 42 is likewise searched for the source address of the packet 32. If the source address of the packet 32 is found in the key table 42, then the corresponding key 50 is retrieved from the key table 42 and a new entry 46 is added to the key cache 40 to include the packet's source address 34*a* and it's corresponding key. Then, the key is retrieved from the key cache 40, the packet 32 is decrypted, and the decrypted packet is stored in the system memory 8.

This aspect of the second preferred embodiment of the present invention allows the transfer of packets from the source (i.e., station 16) to continue without the delays associated with accessing the system memory 8 since an acknowledgment signal is authorized before the key is found in the key table. Sending an acknowledgment signal when the key does not appear in the key cache 40 may desirably save time when the key can be retrieved from the key table 42, stored in the key cache 40, retrieved from the key cache 40, and used for decrypting the packet 32 before the next packet arrives. (If a subsequent packet arrives before this process is completed, that subsequent packet may be dropped so that it must be resent.)

The present invention advantageously uses a key cache 40 for enabling real-time processing necessary for a wireless network together with a key table 42 for enabling storage of relatively large data sets needed for multiple users. The preferred embodiments shown in FIGS. 1 through 3 have included the key cache 40, the key table 42, and related processing in the access point 6. Likewise, the present invention includes embodiments where these structures are included in the station 16, which may require access to multiple keys associated with the possible access points 6. Typically, an access point 6 requires access to substantially more keys than a station 16.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. Computer-readable media tangibly embodying a key-caching program executable on a computer and operating on a packet received from an external source, the computer including a system memory and a cache, the system memory and the cache including entries for source addresses and corresponding keys, the packet including a header that is not encrypted and a body that is encrypted, the key-caching program comprising code for:

establishing acknowledgment-responsive wireless communication with the external source wherein the packet is re-sent after a latency period in the absence of an acknowledgment signal for the packet;

extracting from the header a source address;

determining whether the source address is included in an entry in the cache;

when the source address is included in an entry of the cache, authorizing the acknowledgment signal for the external source, extracting from the entry of the cache a key corresponding to the source address, and using the key to decrypt the body of the packet;

when the source address is not included in an entry of the cache, determining whether the source address is included in an entry of the system memory; and when the source address is not included in an entry of the cache and the source address is included in an entry of the system memory, extracting from the entry of the system memory a key corresponding to the source address, and storing the source address and the key as a new entry in the cache to prepare the cache within the latency period for decrypting the packet subsequently re-sent by the external source.

2. Computer-readable media as claimed in claim 1, wherein the key-caching program further comprises code to effect:

when the source address is not included in an entry of the cache, dropping the packet.

3. Computer-readable media as claimed in claim 2, wherein the cache includes fast memory.

4. Computer-readable media as claimed in claim 1, wherein the key-caching program further comprises code to effect:

when the source address is not included in an entry of the cache, authorizing an acknowledgment signal for anticipatory transmission to the external source of the packet prior to retrieval of the key corresponding to the source address; and when the source address is not included in an entry of the cache and the source address is included in an entry of the system memory, using the key to decrypt the body of the packet prior to arrival of a subsequent packet from the external source.

5. Computer-readable media as claimed in claim 4, wherein the cache includes fast memory.

6. Computer-readable media as claimed in claim 1, wherein the cache includes fast memory.

7. A key-caching system for operation on a packet received from an external source, the packet comprising a header that is not encrypted and a body that is encrypted, the key-caching system comprising:

a system memory, a networking unit, the networking unit including a cache, the system memory and the cache including entries for source addresses and corresponding keys, a processor, the system memory including a key-caching program that is executable on the processor, and a controller, the controller effecting communication and data transfer between the system memory, the networking unit and the processor, wherein the key-caching program comprising code to effect;

establishing acknowledgment-responsive wireless communication with the external source wherein the packet is re-sent after a latency period in the absence of an acknowledgement signal for the packet;

extracting from the header a source address;

determining whether the source address is included in an entry in the cache;

when the source address is included in an entry of the cache, authorizing the acknowledgment signal for the external source, extracting from the entry of the cache a key corresponding to the source address, and using the key to decrypt the body of the packet;

when the source address is not included in an entry of the cache, determining whether the source address is included in an entry of the system memory; and when the source address is not included in an entry of the cache and the source address is included in an entry of the system memory, extracting from the entry of the system memory a key corresponding to the source address, and storing the source address and the key as a new entry in the cache to prepare the cache within the latency period for decrypting the packet subsequently re-sent by the external source.

8. A key-caching system as claimed in claim 7, wherein the key-caching program further comprises code to effect:

when the source address is not included in an entry of the cache, dropping the packet.

9. A key-caching system as claimed in claim 8, wherein the cache includes fast memory.

10. A key-caching system as claimed in claim 7, wherein the key-caching program further comprises code to effect:

when the source address is not included in an entry of the cache, authorizing an acknowledgment signal for anticipatory transmission to the external source of the packet prior to retrieval of the key corresponding to the source address; and when the source address is not included in an entry of the cache and the source address is included in an entry of the system memory, using the key to decrypt the body of the packet prior to arrival of a subsequent packet from the external source.

11. A key-caching system as claimed in claim 9, wherein the cache includes fast memory.

12. A key-caching system as claimed in claim 7, wherein the cache includes fast memory.

13. A method of key caching with a system memory and a cache, the system memory and the cache including entries for source addresses and corresponding keys, the method comprising:

establishing acknowledgment-responsive wireless communication with an external source wherein the packet is re-sent after a latency period in the absence of an acknowledgment signal for the packet;

receiving a packet from the external source, the packet including a header that is not encrypted and a body that is encrypted;

extracting from the header a source address;

determining whether the source address is included in an entry in the cache, authorizing the acknowledgment signal for the external source when the source address is not included in an entry of the cache, extracting from the entry of the cache a key corresponding to the source address, and using the key to decrypt the body of the packet;

when the source address is not included in an entry of the cache, determining whether the source address is included in an entry of the system memory; and when the source address is not included in an entry of the cache and the source address is included in an entry of the system memory, extracting from the entry of the system memory a key corresponding to the source address, and storing the source address and the key as a new entry in the cache to prepare the cache within the latency period for decrypting the packet subsequently re-sent by the external source.

14. A method of key caching as claimed in claim 13, further comprising:

when the source address is not included in an entry of the cache, dropping the packet.

15. A method of key caching as claimed in claim 14, wherein the cache includes fast memory.

16. A method of key caching as claimed in claim 13, further comprising:

when the source address is not included in an entry of the cache, authorizing an acknowledgment signal for anticipatory transmission to the external source of the packet prior to retrieval of the key corresponding to the source address; and when the source address is not included in an entry of the cache and the source address is included in an entry of the system memory, using the key to decrypt the body of the packet prior to arrival of a subsequent packet from the external source.

17. A method of key caching as claimed in claim 16, wherein the cache includes fast memory.

18. A method of key caching as claimed in claim 13, wherein the cache includes fast memory.

* * * * *